(12) United States Patent
Sakaguchi et al.

(10) Patent No.: US 8,158,035 B2
(45) Date of Patent: Apr. 17, 2012

(54) LIGHT DIFFUSING MEMBER WITH CERAMIC PARTICLES CONTAINING MAGNESIUM OXIDE AND ALUMINUM OXIDE

(75) Inventors: Mikio Sakaguchi, Wakayama (JP); Kazuo Oki, Wakayama (JP)

(73) Assignee: Kao Corporation, Tokyo (JP)

( * ) Notice: Subject to any disclaimer, the term of this patent is extended or adjusted under 35 U.S.C. 154(b) by 429 days.

(21) Appl. No.: 12/515,257

(22) PCT Filed: Dec. 26, 2007

(86) PCT No.: PCT/JP2007/074972
§ 371 (c)(1),
(2), (4) Date: May 15, 2009

(87) PCT Pub. No.: WO2008/081821
PCT Pub. Date: Jul. 10, 2008

(65) Prior Publication Data
US 2010/0027125 A1 Feb. 4, 2010

(30) Foreign Application Priority Data
Dec. 27, 2006 (JP) ................................ 2006-352150

(51) Int. Cl.
*F21V 9/00* (2006.01)
*G02B 1/00* (2006.01)
(52) U.S. Cl. ............................ 252/582; 501/33; 501/153
(58) Field of Classification Search .................... 501/33, 501/34, 41, 153; 252/582; 423/625, 635
See application file for complete search history.

(56) References Cited

U.S. PATENT DOCUMENTS

| | | | | |
|---|---|---|---|---|
| 3,238,048 | A * | 3/1966 | Somers | 501/153 |
| 5,382,556 | A * | 1/1995 | Takahashi et al. | 501/153 |
| 6,514,892 | B1 * | 2/2003 | Kasai et al. | 501/34 |
| 6,881,448 | B1 | 4/2005 | Hattori | |
| 2002/0013207 | A1 * | 1/2002 | Frey et al. | 501/34 |
| 2004/0148869 | A1 * | 8/2004 | Celikkaya et al. | 51/308 |
| 2005/0135118 | A1 * | 6/2005 | Takata | 362/615 |
| 2006/0047035 | A1 * | 3/2006 | Chang et al. | 524/261 |
| 2006/0127664 | A1 | 6/2006 | Geary et al. | |
| 2006/0127669 | A1 | 6/2006 | Kogol et al. | |
| 2006/0186803 | A1 | 8/2006 | Lim et al. | |
| 2010/0067258 | A1 * | 3/2010 | Hahn et al. | 362/627 |
| 2010/0240520 | A1 * | 9/2010 | Sakaguchi et al. | 501/153 |
| 2011/0039685 | A1 * | 2/2011 | Mao et al. | 501/153 |
| 2011/0062393 | A1 * | 3/2011 | Seneschal-Merz et al. | 252/582 |

FOREIGN PATENT DOCUMENTS

| | | | |
|---|---|---|---|
| EP | 0 971 246 | A1 | 1/2000 |
| EP | 1 097 752 | A2 | 5/2001 |
| JP | 11170449 | A * | 6/1999 |
| JP | 11322439 | A * | 11/1999 |
| JP | 2001-188109 | A | 7/2001 |
| JP | 2001-191025 | A | 7/2001 |
| JP | 2003-156604 | A | 5/2003 |
| JP | 2004-262674 | A | 9/2004 |
| JP | 2006-40864 | A | 2/2006 |
| JP | 2006-208985 | A | 8/2006 |
| JP | 2006-208993 | A | 8/2006 |
| JP | 2006-236968 | A | 9/2006 |
| JP | 2006-298708 | A | 11/2006 |
| JP | 2006-312746 | A | 11/2006 |
| JP | 2008162825 | A * | 7/2008 |
| WO | WO-99/38036 | A1 | 7/1999 |
| WO | WO-2004/065495 | A2 | 8/2004 |

OTHER PUBLICATIONS

European Patent Office Action issued on May 18, 2010 in corresponding European Patent Application No. 07 860 201.
Extended European Search Report for EP 07 86 0201, dated Dec. 23, 2009.
Chinese Patent Office Action corresponding to Chinese Patent Application No. 200780048065.1, issued Jun. 23, 2010.
Chinese Patent Office Action corresponding to Chinese Patent Application No. 200780048065.1, issued Nov. 30, 2011.

* cited by examiner

*Primary Examiner* — Mark Consilvio
(74) *Attorney, Agent, or Firm* — Birch, Stewart, Kolasch & Birch, LLP

(57) ABSTRACT

It is an object of the present invention to provide a light diffusing member which has excellent optical transparency and light resistance and has excellent light diffusibility despite of a small amount of filler to be added, and a method for producing the same. The light diffusing member of the present invention is a light diffusing member including a base material and ceramic particles contained in the base material, wherein the ceramic particles have a composition in which the total amount of MgO and $Al_2O_3$ is 80% by weight or more and the weight ratio [$MgO/Al_2O_3$] of MgO and $Al_2O_3$ is 0.05 to 5.

15 Claims, No Drawings

LIGHT DIFFUSING MEMBER WITH CERAMIC PARTICLES CONTAINING MAGNESIUM OXIDE AND ALUMINUM OXIDE

TECHNICAL FIELD

The present invention relates to a light diffusing member having a base material and ceramic particles contained in the base material, the ceramic particles having a ceramic composition containing MgO and $Al_2O_3$, and a method for producing the same.

BACKGROUND ART

A light diffusing member is used in order to control the scattering and transmission of light of a light source to effectively use the light in optical products such as a lighting cover, an illuminated sign, a transmission type display and a liquid crystal display. A filler (hereinafter, may also be referred to as a light diffusing filler) having light diffusibility is added into a transparent base material such as glass or a resin to control the light scattering intensity and total transmissivity of the light diffusing member as basic characteristics.

Conventionally, inorganic or organic particles have been used as the light diffusing filler. It is said that the inorganic light diffusing filler is characterized by more excellent light resistance and chemical resistance than those of the organic filler. Silica, alumina, calcium carbonate, barium sulfate, titanium oxide, aluminum hydroxide, glass, talc, mica and the like are used as the inorganic light diffusing filler (for example, Patent Document 1).

Patent Document 1: Japanese Patent Application Laid-Open No. 2001-188109

DISCLOSURE OF THE INVENTION

Problem to be Solved by the Invention

However, although the light diffusing member using the conventional inorganic light diffusing filler developed high optical transparency and light resistance, the light diffusing member had a problem that the light diffusibility was insufficient. As a result, it is necessary to increase the amount of the inorganic light diffusing filler to be added in order to enhance the light diffusibility of the light diffusing member. The increase of the amount was industrially disadvantageous in respect of cost per performance.

Accordingly, it is an object of the present invention to provide a light diffusing member which has excellent optical transparency and light resistance and has excellent light diffusibility despite of a small amount of filler to be added, and a method for producing the same.

Means for Solving the Problem

The present inventors found that a light diffusing member including a base material and ceramic particles contained in the base material, the ceramic particles having a ceramic composition containing MgO and $Al_2O_3$, has excellent light diffusibility despite of a small amount of filler to be added. As a result, the present invention has been completed.

Namely, the light diffusing member of the present invention is a light diffusing member including a base material and ceramic particles contained in the base material, wherein the ceramic particles have a composition in which the total amount of MgO and $Al_2O_3$ is 80% by weight or more and the weight ratio $[MgO/Al_2O_3]$ of MgO and $Al_2O_3$ is 0.05 to 5.

Various kinds of physical property values in the present invention are values specifically measured by a method to be described in Examples.

Also, the method for producing the light diffusing member of the present invention is a method for producing the above-mentioned light diffusing member including a step of dispersing the ceramic particles in the base material.

BEST MODE FOR CARRYING OUT THE INVENTION

A light diffusing member of the present invention has a base material and ceramic particles contained in the base material. Preferably, the light diffusing member has a total transmissivity of 50% or more and a light scattering intensity of 70% or more. The light diffusing member contains ceramic particles of a first aspect or a second aspect to be described below. The present invention can provide the light diffusing member having excellent optical transparency and light resistance and having excellent light diffusibility even with a small amount of filler to be added by using the ceramic particles of the following first aspect or second aspect as a light diffusing filler. The light diffusing member of the present invention includes both a case where the base material contains the ceramic particles and a case where a surface part of the base material contains the ceramic particles.

In the first aspect of the present invention, the ceramic particles contained in the base material satisfy the following requirements (I) and (II). Furthermore, in the first aspect, the ceramic particles are preferably produced by a flame fusion method.

(I) The total amount of MgO and $Al_2O_3$ in a ceramic composition is 80% by weight or more.

(II) The weight ratio $[MgO/Al_2O_3]$ of MgO and $Al_2O_3$ in the ceramic composition is 0.05 to 5.

On the other hand, in the second aspect of the present invention, the ceramic particles contained in the base material is obtained by fusing powder particles satisfying the following requirements (III) and (IV) in flame.

(III) The total amount of MgO and $Al_2O_3$ is 80% by weight or more.

(IV) The weight ratio $[MgO/Al_2O_3]$ of MgO and $Al_2O_3$ is 0.05 to 5.

That is, in the first aspect, the ceramic composition of the ceramic particles contained in the base material is specified by the requirements (I) and (II). On the other hand, in the second aspect, the composition of powder particles as the raw material of the ceramic particles contained in the base material is specified by the requirements (III) and (IV). Thereby, the requirements (III) and (IV), which do not have to be satisfied by the ceramic composition, may be satisfied by the composition of a raw material mixture.

The second aspect of the present invention is limited to the ceramic particles obtained by fusing the powder particles in the flame. However, the ceramic particles of the first aspect are not limited to particles obtained by such a method.

Hereinafter, respects common to the first and second aspects of the present invention will be described.

[Composition]

As for the requirements (I) and (III), the content of MgO and $Al_2O_3$ is preferably 85% by weight or more, more preferably 90% by weight or more, and particularly preferably 100% by weight from the viewpoint of securing preferred light diffusibility and optical transparency.

As for the requirements (II) and (IV), the weight ratio of MgO/Al$_2$O$_3$ is preferably 0.1 to 5, more preferably 0.2 to 4, and still more preferably 0.3 to 2 from the viewpoint of securing preferred light diffusibility and optical transparency.

As for the requirements (I) and (III), examples of components of powder particles (hereinafter, also referred to as accessory components) which may be contained in the composition in addition to a component made of MgO and Al$_2$O$_3$ include metal oxides such as CaO, Fe$_2$O$_3$, TiO$_2$, K$_2$O, Na$_2$O and ZrO$_2$, and carbon.

From the viewpoint of securing preferred optical transparency and chemical stability, the total amount of the accessory components is less than 20% by weight, preferably less than 5% by weight, and more preferably less than 0.1% by weight in the ceramic particles. When the accessory components contain coloring components such as Fe, particularly from the viewpoint of securing optical transparency, the contents thereof are respectively and preferably less than 1% by weight, more preferably less than 0.5% by weight, and still more preferably less than 0.1% by weight.

[Average Particle Diameter]

The average particle diameter of the ceramic particles used for the present invention is preferably 100 μm or less, more preferably 50 μm or less, and still more preferably 10 μm or less from the viewpoints of securing preferred light diffusibility and optical transparency and of securing the mechanical strength of the light diffusing member when the ceramic particles are added into the base material for the production thereof. The average particle diameter is preferably 0.01 μm or more, more preferably 0.1 μm or more, and still more preferably 0.2 μm or more from the viewpoints of suppressing the aggregation and coalescence of the particles, of making the particle size distribution of the ceramic particles not so large, and of the sphericity. The average particle diameter is measured by a method to be described in Examples. From all of the above-mentioned viewpoints, the average particle diameter is preferably 0.01 to 100 μm, more preferably 0.1 to 50 μm, and still more preferably 0.2 to 10 μm.

[Sphericity]

The sphericity of the ceramic particles used for the present invention is preferably 0.95 or more, more preferably 0.96 or more, and still more preferably 0.98 or more from the viewpoint of securing preferred light diffusibility and optical transparency. When the sphericity is within this range, the dispersibility of the ceramic particles into the base material is excellent to enable the high addition of the ceramic particles and easy provision of the optical properties of the light diffusing member. The sphericity is measured by a method to be described in Examples.

[Percentage of Absorption]

It is preferable that the surface of the ceramic particles used for the present invention has few pores from the viewpoint of suppressing the generation of extra air bubbles in the light diffusing member and of attaining preferred light diffusibility and optical transparency. The percentage of absorption of the ceramic particles can be used as an index as the porosity of the surface. That is, the number of pores of the ceramic particles tends to be small when the percentage of absorption is small. The percentage of absorption is preferably 0.8% by weight or less, more preferably 0.5% by weight or less, and still more preferably 0.3% by weight or less. The percentage of absorption can be reduced by enlarging the average particle diameter of the ceramic particles, and the percentage of absorption can be further reduced by carrying out a flame fusion treatment. The percentage of absorption is measured by a method to be described in Examples.

[Refraction Factor]

The refraction factor of the ceramic particles used for the present invention is preferably 1.6 to 1.8, more preferably 1.65 to 1.75, and still more preferably 1.67 to 1.73 from the viewpoint of securing the excellent light diffusibility and optical transparency of the light diffusing member. The composition of the ceramic and the crystal structure thereof to be described later can be adjusted to a suitable range to adjust the refraction factor to a suitable range.

[Color]

The color of the ceramic particles used for the present invention is preferably white from the viewpoint of securing optical transparency. As the whiteness degree, an L* value measured by a spectrum type colorimeter is preferably 85 or more, more preferably 90 or more, and still more preferably 95 or more. The whiteness degree can be obtained by adjusting the amount and composition of the accessory components in the ceramic particles as described in the explanations of requirements (I) and (III). The whiteness degree is measured by a method to be described in Examples.

[Crystal Structure]

The ceramic particle used for the present invention is a composite compound containing a component made of MgO and Al$_2$O$_3$ as a main component. The structure thereof may be an amorphous structure (amorphous) or a crystal structure (crystalline). The ceramic particle is preferably crystalline from the viewpoint of having excellent heat resistance, chemical resistance or light resistance, and of securing stable light diffusibility. The high crystallization of the ceramic particles can be achieved by adjusting the firing temperature to 1200 to 1850° C. and adjusting the firing time to 1 to 5 hours during production.

When the above-mentioned adjustment is performed by using the ceramic particles in which the weight ratio [MgO/Al$_2$O$_3$] of MgO and Al$_2$O$_3$ is 0.05 to 5 in the present invention, a main peak obtained by X-ray diffraction pattern measurements attributes to MgAl Spinel of No. 21-1152 of JCPDS (Joint Committee on Powder Diffraction Standards). Such ceramic particles are preferable from the viewpoint of enhancing light diffusibility and optical transparency.

[Surface Treatment]

The ceramic particles used for the present invention are preferably subjected to surface treatment using a silane coupling agent, silicone, a fatty acid soap or the like from the viewpoint of enhancing the dispersibility of the ceramic particles in the base material.

[Specific Gravity]

The specific gravity of the ceramic particles used for the present invention is preferably 3 to 4. In this case, desired optical properties can be easily developed with a small amount of the ceramic particles to be added.

[Fluidity]

It is preferable that the ceramic particles have a moderate fluidity from the viewpoint of enhancing workability in adding the ceramic particles used for the present invention into the base material and processability thereafter. As for the fluidity, a repose angle measured by a powder tester is defined as an index. The repose angle is preferably 55 degrees or less, more preferably 50 degrees or less, and still more preferably 48 degrees or less. The repose angle can be adjusted to a preferred range by enlarging the sphericity of the ceramic particles and reducing the percentage of absorption. The repose angle can be measured by a method to be described in Examples.

The sphericity of the ceramic particles is preferably 0.95 or more, 0.96 or more, and still more preferably 0.98 or more in order to set the repose angle to the above-mentioned range.

The percentage of absorption is preferably 0.8% by weight or less, more preferably 0.5% by weight or less, and still more preferably 0.3% by weight or less in order to set the repose angle to the above-mentioned range. The percentage of absorption can be reduced by enlarging the average particle diameter of the ceramic particles. The percentage of absorption can be further reduced by carrying out the flame fusion treatment.

[Method for Producing Ceramic Particles]

The ceramic particles in the present invention can be obtained by using techniques such as a mixing method, a precipitate method, a sol-gel method, a spray pyrolysis method, a hydrothermal method and a CVD method, or by firing and pulverizing a precursor containing MgO and $Al_2O_3$ so that the total amount of MgO and $Al_2O_3$ be 80% by weight or more and an $MgO/Al_2O_3$ weight ratio be 0.05 to 5.

The following raw material sources may be used either alone or in combination of two or more kinds thereof as raw materials for forming the precursor.

Examples of $Al_2O_3$ sources include aluminum oxide, aluminum hydroxide, boehmite, aluminum sulfate, aluminium nitrate, aluminium chloride, an alumina sol, and aluminium alkoxides such as aluminium isopropoxide.

Examples of MgO sources include magnesium carbonate, magnesium oxide, and magnesium hydroxide.

Examples of methods for spheroidizing the ceramic particles of the present invention include a spray drying method performing spray drying in forming the precursor, an emulsifying method emulsifying the ceramic particles using a surface active agent in forming the precursor, and a flame fusion method directly flame-fusing a fired body or a precursor. The ceramic particles are preferably spheroidized by the flame fusion method from the viewpoint of enhancing the sphericity and of reducing the percentage of absorption. The flame fusion method disperses raw material powder particles in a carrier gas such as oxygen and supplies the raw material powder particles into flame to fuse and spheroidize the raw material powder particles. Hereinafter, the flame fusion method will be described in detail.

[Composition of Powder Particles as Raw Material]

Powder particles containing 80% by weight or more of MgO and $Al_2O_3$, having an $MgO/Al_2O_3$ weight ratio of preferably 0.05 to 5 and having an average particle diameter of preferably 100 μm or less is used as a starting material. As the starting material, the powder particles in the form of a fired body or precursor can be used. Preferably, the powder particles are in the form of a fired body having the above-mentioned ceramic composition.

The content rate of MgO and $Al_2O_3$ in the powder particles is preferably 85% by weight or more, more preferably 90% by weight or more, and particularly preferably 100% by weight. The weight ratio of $MgO/Al_2O_3$ is preferably 0.05 to 5, more preferably 0.1 to 5, and still more preferably 0.2 to 4. From the viewpoint of obtaining spherical particles having a narrow particle size distribution, the weight ratio is still more preferably 0.3 to 2. In order to obtain desired ceramic particles, the powder particles as the starting material are preferably adjusted and used so that the $MgO/Al_2O_3$ weight ratio is within the above-mentioned range in view of component evaporation during fusing.

[Average Particle Diameter and Shape of Powder Particles]

The average particle diameter of the powder particles as the raw material is preferably 100 μm or less, more preferably 50 μm or less, and still more preferably 10 μm or less. From the viewpoint of suppressing the particle diameter and sphericity diversify in a wide range, the average particle diameter is preferably 0.01 μm or more, more preferably 0.1 μm or more, and still more preferably 0.2 μm or more. From all of the above-mentioned viewpoints, the average particle diameter is preferably 0.01 to 100 μm, more preferably 0.1 to 50 μm, and still more preferably 0.2 to 10 μm.

From the viewpoint of rapidly spheroidizing the ceramic particles in the flame and of obtaining ceramic particles in which the distribution width of the particle diameter is not so large and which has a high sphericity, it is preferable to select the shape of the raw material powder particles. As the shape, the raw material powder particles have a major axis diameter/minor axis diameter ratio of preferably 9 or less, more preferably 4 or less, and still more preferably 2 or less from the viewpoint of ensuring the residence time in the flame and fusing to rapidly form spherical particles.

[Water Content of Powder Particles]

If the powder particles as the starting material contain water when the powder particles are fused, the water may evaporate and a large number of openings may be formed in the obtained ceramic particles with the evaporation of water. Accordingly, from the viewpoint of adjusting the percentage of absorption and a sphericity of the obtained particles to a suitable range, the water content (% by weight) of the starting material is preferably 10% by weight or less, more preferably 3% by weight or less, and still more preferably 1% by weight or less. The reduction in weight of 1 g of the powder particles is measured when the powder particles are heated at 800° C. for 1 hour. The water content can be determined from the formula of (weight before heating−weight after heating)/weight before heating×100.

[Examples of Raw Material Powder Particles]

Examples of raw materials as the $Al_2O_3$ source include bauxite, aluminous shale, aluminum oxide, aluminum hydroxide, boehmite, aluminum sulfate, aluminium nitrate, aluminium chloride, an alumina sol, and aluminium alkoxides such as aluminium isopropoxide.

Examples of raw materials as the MgO source include magnesium carbonate, magnesium oxide, magnesium hydroxide, olivine, pyroxene, dunite, serpentine, and olivine-based minerals.

These raw materials may be used either alone or in combination of two or more kinds thereof. The selected starting material is preferably used by forming spinel in order to reduce the water content thereof or to facilitate the fusion thereof. Examples of methods for forming spinel include calcining, sintering, and electrofusing. The calcining is preferable from the viewpoint of energy cost.

[Spheroidizing by Flame Fusion Method]

In a spheroidizing process of the powder particles as the raw material, the flame fusion method is preferably applied. In the flame fusion method, the raw material powder particles are dispersed in a carrier gas such as oxygen. The raw material powder particles are fused by being introduced into the flame for spheroidizing.

The flame is generated by burning a fuel such as propane, butane, methane, natural liquefied gas, LPG, heavy oil, kerosene, light oil or dust coal, with oxygen. The flame may be plasma jet flame generated by ionizing an $N_2$ inactive gas or the like.

The volume ratio of the fuel to oxygen is preferably 1.01 to 1.3 from the viewpoint of complete combustion. An oxygen gas burner is preferably used from the viewpoint of generating hot flame. The structure of the burner is not particularly limited. However, the burner disclosed in Japanese Patent Application Laid-Open Nos. 7-48118, 11-132421, 2000-205523 or 2000-346318 is preferable.

The flame temperature is preferably the fusing point or more of the raw material powder particles from the viewpoint of fusing and spheroidizing the raw material powder particles. Specifically, the flame temperature is preferably 2200° C. or more, more preferably 2300° C. or more, and still more preferably 2400° C. or more.

The powder particles are preferably introduced into the flame being dispersed in a carrier gas. As the carrier gas, oxygen is preferably used. In this case, oxygen for the carrier gas provides an advantage that the oxygen can be consumed for fuel combustion. The powder concentration in the gas is preferably 0.1 to 20 kg/Nm³, and more preferably 0.2 to 10 kg/Nm³ from the viewpoint of securing sufficient dispersibility of the powder particles. When the powder particles are introduced into the flame, it is more preferable to make the powder particles pass through a mesh, a static mixer or the like to enhance the dispersibility of the powder particles.

[Light Diffusing Member]

It is preferable that the light diffusing member of the present invention has a total transmissivity of 50% or more and a light scattering intensity of 70% or more as the total transmissivity and the light scattering intensity measured by a haze meter. The total transmissivity is more preferably 70% or more, and the light scattering intensity is more preferably 80% or more. It is preferable that the light diffusing member has such optical properties when the content of the ceramic particles is 50 parts by weight or less based on 100 parts by weight of the base material of the light diffusing member. It is more preferable that the light diffusing member has such optical properties when the content thereof is 10 parts by weight or less.

[Base Material]

The base material used for the present invention is not particularly limited as long as the base material is made of a transparent material, and glass, a resin or the like can be used. It is preferable to use a resin from the viewpoint of excellent formability. For example, as glass, alkali glass such as soda lime glass and borosilicate glass are suitably used. As the resin, a thermoplastic resin, a thermosetting resin, and an energy-ray curable resin cured by ultraviolet rays or the like can be used. Examples thereof include polyolefin resins such as polyethylene and polypropylene, polyester resins such as polyethylene terephthalate, cellulosic resins such as triacetylcellulose and butyl cellulose, polystyrene, polyurethane, polyvinyl chloride, an acrylic resin, a polycarbonate resin, an epoxy resin, a phenol resin, a silicone resin, and polyurethane. Of these, from the viewpoint of transparency, light resistance and heat resistance, the acrylic resin, the polycarbonate resin and the epoxy resin are preferable, and the acrylic resin is more preferably used.

Of these, for the light diffusing member to secure excellent light diffusibility and optical transparency, the refraction factor of the base material is preferably 1.3 to 1.65, more preferably 1.45 to 1.63, still more preferably 1.50 to 1.62, and particularly preferably 1.55 to 1.62.

The base material and the ceramic particles are preferably combined so that the difference between the refraction factor of the base material and the refraction factor of the ceramic particles is preferably 0.01 to 0.3, more preferably 0.03 to 0.2, and still more preferably 0.05 to 0.15 for the light diffusing member to secure excellent light diffusibility and optical transparency.

Table 1 shows the examples of preferred combinations of the base material and the ceramic particles.

TABLE 1

| Base material resin and refraction factor thereof | | Difference between refraction factors of ceramic particle (refraction factor: 1.72) and base material resin |
|---|---|---|
| Fluorine resin | 1.35 | 0.37 |
| Silicone resin | 1.48 | 0.24 |
| Polyvinyl alcohol resin | 1.51 | 0.21 |
| Polyamide resin | 1.53 | 0.19 |
| Epoxy resin | 1.61 | 0.11 |
| Cellulosic resin | 1.50 | 0.22 |
| Polystyrene resin | 1.60 | 0.12 |
| Vinyl chloride resin | 1.54 | 0.18 |
| Polyethylene resin | 1.51 | 0.21 |
| Polypropylene resin | 1.51 | 0.21 |
| Polycarbonate resin | 1.59 | 0.13 |
| Polyester resin | 1.59 | 0.13 |
| Acrylic resin | 1.49 | 0.23 |

Ceramic particles: total amount of MgO and $Al_2O_3$ = 99% by weight [MgO/$Al_2O_3$] weight ratio = 0.4

The amount of the ceramic particles based on 100 parts by weight of the base material is 0.1 parts by weight or more, and more preferably 0.5 parts by weight or more from the viewpoint of securing the excellent light diffusibility and optical transparency of the light diffusing member, particularly from the viewpoint of securing the excellent light diffusibility. Particularly, from the viewpoint of securing optical transparency, the amount thereof is preferably 1000 parts by weight or less, more preferably 100 parts by weight or less, still more preferably 30 parts by weight or less, still more preferably 10 parts by weight or less, still more preferably 6 parts by weight or less, still more preferably 2 parts by weight or less, and particularly preferably 1 part by weight or less. From all of the above-mentioned viewpoints, the amount thereof is preferably 0.1 to 1000 parts by weight, more preferably 0.1 to 100 parts by weight, still more preferably 0.1 to 30 parts by weight, still more preferably 0.1 to 10 parts by weight, still more preferably 0.1 to 6 parts by weight, still more preferably 0.1 to 2 parts by weight, and particularly preferably 0.1 to 1 part by weight.

A release agent, a heat stabilizer, an ultraviolet absorbent, a colorant, a phosphor, an illuminant, a reinforcing agent or the like can be added into the light diffusing member of the present invention as necessary in a range where light diffusibility and optical transparency are not impaired. From the viewpoint of light diffusibility and the optical transparency, the addition amount thereof is preferably 10% by weight or less, and more preferably 5% by weight or less in the light diffusing member.

The light diffusing member of the present invention may have any form. Examples of the form include a sheet form, a lens form, a columnar form and a plate form. The sheet form is preferable when uniform light diffusibility and high optical transparency are obtained.

When the light diffusing member has a sheet form, the thickness thereof is preferably 0.05 μm or more, more preferably 1 μm or more, still more preferably 10 μm or more from the view point of securing excellent light diffusibility and optical transparency of the light diffusing member, particularly from the viewpoint of securing the excellent light diffusibility. Particularly, from the viewpoint of securing the excellent optical transparency, the thickness is preferably 20 mm or less, more preferably 10 mm or less, and still more preferably 5 mm or less. From all of the above-mentioned viewpoints, the thickness is preferably 0.05 μm to 20 mm, more preferably 1 μm to 10 mm, and still more preferably 10 μm to 5 mm.

[Method of Producing Light Diffusing Member]

The light diffusing member of the present invention can be suitably produced by the production method of the present invention. That is, the production method of the present invention, which produces the light diffusing member described above, includes a step of dispersing the ceramic particles in the base material. The ceramic particles can be suitably dispersed, for example, by any one of following steps (a) to (d):

(a) a step of kneading the ceramic particles in the base material using a kneading machine or the like;

(b) a step of mixing the ceramic particles into a solution, emulsion, dispersion or suspension of a resin constituting the base material, and molding this mixture into a sheet form;

(c) a step of forming a layer containing the ceramic particles and a binder on the surface of the sheet as the base material; and (d) a step of adding the ceramic particles into monomers of the resin and polymerizing the monomers when the resin constituting the base material is synthesized.

Of these, as shown in the step (a), a method of kneading the ceramic particles into the base material using a kneading machine or the like is preferable, and a method of molding the mixture into a sheet form after kneading is more preferable. In that case, known kneading machines such as a kneading roller, a biaxial kneader, a kneader, an internal mixer and an extruder can be used as the kneading machine. A roll molding machine, an injection molding machine, an extrusion molding machine, a heat pressing molding machine or the like can be used as a molding machine.

In the step (b), for example, various liquid media for converting a resin into a solution, a dispersion or the like are used. The mixture is applied to a coating support, and the liquid medium is then dried. A blade coater, a comma coater, a bar coater, a calender coater, a dip coater or the like can be used for coating.

In the step (c), for example, a coating solution containing the ceramic particles and the binder is applied to the surface of a sheet as the underlying base material as in the step (b). The coating solution is then dried, and thereby the layer containing the ceramic particles and the binder can be formed.

In the step (d), for example, a monomer composition containing the ceramic particles is applied as in the step (b) The monomer composition can be then polymerized under a condition corresponding to the kind of the monomer. In that case, a catalyst, an initiator, a crosslinking agent or the like can be added as necessary.

[Application]

The light diffusing member of the present invention is suitably used for, for example, a liquid crystal display, a transmission type or reflection type screen, a lighting cover, an illuminated sign, a Fresnel lens for projectors, a light emitting diode or the like as the specific application although the shape of the light diffusing member is not particularly limited according to the application thereof.

Hereinafter, the present invention will be specifically described with reference to Examples and the like. Evaluation items in Examples and the like were measured as follows.

(1) Composition

The analysis of elements is performed using a fluorescent X-ray method (JIS R2216 "fluorescent X-ray analysis of refractory brick and fire mortar") to determine the quantity of a composition of each of atomic elements of Al and Mg. The X-ray diffraction measurement is performed, and the existence of $Al_2O_3$, MgO or a composite compound thereof is confirmed from the diffraction pattern. When the diffraction pattern is not obtained, the existences of $Al_2O_3$ and MgO are confirmed by the measurement methods such as Raman spectrum, IR and NMR. As described above, the total amount of MgO and $Al_2O_3$ and the weight ratio [$MgO/Al_2O_3$] of MgO and $Al_2O_3$ are calculated.

(2) Average Particle Diameter

The average particle diameter, which means D50 (a median particle diameter of 50% as a volume-criterion), is measured by a laser diffraction/scattering method using "LA-920" manufactured by Horiba, Ltd.

(3) Sphericity

The sphericity of the ceramic particles is calculated as follows. The area of a particle projected section of a SEM image obtained by measuring the ceramic particles using a real surface view microscope VF-7800 (manufactured by Keyence Corporation), and the peripheral length of the section are determined. [Peripheral length of complete circle having the same area as that of particle projected section]/ [peripheral length of particle projected section] is calculated, and the values obtained from 50 randomly selected particles are averaged to determine the sphericity.

(4) Percentage of Absorption

The percentage of absorption is measured according to JIS A1109 "Method for measuring percentage of absorption of fine aggregate".

(5) Repose Angle

The measurement of the repose angle is based on JIS R9301-2-2. As a powder tester used for measuring the repose angle, TYPEPT-E manufactured by Hosokawa Micron Corporation is used.

(6) Refraction Factor

The Refraction factors of the ceramic particles and the base material resin are based on a B method (immersion method using microscope (Becke's line method)) of JIS K7142 "Method for measuring refraction factor of plastic". However, a "contact liquid" manufactured by Shimadzu Device Corporation is used in place of an immersion liquid used in JIS K7142. The refraction factor is measured under a condition where the temperature is 15 to 20° C. A polarization microscope "Optiphoto" (manufactured by Nikon Corporation) is used as a microscope.

(7) Total Transmissivity and Light Scattering Intensity

The parallel beam transmissivity (Tp) and the scattering light transmissivity (Td) are measured by a haze meter [manufactured by Murakami Color Research Laboratory (type: HR-100)]. The total transmissivity is calculated by Tp+Td, and [Td/(Tp+Td)]×100 is calculated to determine the light scattering intensity. It is estimated that the larger the total transmissivity is, the higher the optical transparency is, and the larger the light scattering intensity is, the higher the light diffusibility is.

(8) Light Resistance Test (Accelerated Light Resistance Test Method)

Two members to be compared, which are set on Sunshine Super Long-life Weatherometer (manufactured by Suga Test Instruments Co., Ltd.), are irradiated with carbon arc light. The yellowness degree (b*) of each of samples before and after being irradiated is measured using a spectrum type calorimeter (SE-2000) (manufactured by Nippon Denshoku Industries Co., Ltd.). The degree of yellowing of the samples before and after being irradiated is compared using the formula shown below.

$$\Delta b^* = b^* \text{after being irradiated} - b^* \text{ before being irradiated}$$

(9) Specific Gravity

The specific gravity is measured according to JIS R1620.

Production Example 1

Alumina (purity: 99.9%) and magnesia (purity: 99.9%) were heated and melted in an arc type electric furnace at 2500° C. for 0.5 hour so that an $MgO/Al_2O_3$ weight ratio became 0.4. Alumina and magnesia were cooled and solidified to obtain an ingot of fused spinel. The obtained ingot was pulverized, and the pulverized material was made to pass through a 400 mesh sieve to obtain ceramic particles 1 having properties shown in Table 2.

Production Example 2

The ceramic particles 1 were used as raw material powder particles. Using oxygen as a carrier gas, the powder particles were introduced into flame (2400° C.) generated by burning LPG (propane gas) and oxygen at a volume ratio of LPG to oxygen of 1.1, to obtain ceramic particles 2 having properties shown in Table 2.

Production Example 3

Alumina (purity: 99.9%) and magnesia (purity: 99.9%) were wet-blended in ion exchange water so that an $MgO/Al_2O_3$ weight ratio became 0.4. The vacuum-dried powder (average particle diameter: 2.2 µm) was fired at 1600° C. for 4 hours. The fired powder was dry-pulverized and then classified to obtain ceramic particles 3 having properties shown in Table 2.

Production Example 4

The ceramic particles 3 were used as raw material powder particles. Using oxygen as a carrier gas, the powder particles were introduced into flame (2400° C.) generated by burning LPG (propane gas) and oxygen at a volume ratio of LPG to oxygen of 1.1, to obtain ceramic particles 4 having properties shown in Table 2.

Production Example 5

$AlCl_3.6H_2O$ (12.3 parts by weight) and $MgCl_2.6H_2O$ (5.08 parts by weight) were melted in 100 parts by weight of ion exchange water to produce a transparent liquid (solution A). Next, the solution A was added into 325 parts by weight of a 5.8% by weight ammonia water, and the obtained solution was stirred for 30 minutes while the pH of the solution was adjusted to 9.5 to 10. The obtained precipitate was filtered and washed. The precipitate was dried at 100° C. for 48 hours. The obtained dried material was fired at 1100° C. for 1 hour and pulverized to obtain ceramic particles 5 having properties shown in Table 2.

Production Example 6

The ceramic particles 5 were used as raw material powder particles. Using oxygen as a carrier gas, the powder particles were introduced into flame (2400° C.) generated by burning LPG (propane gas) and oxygen at a volume ratio of LPG to oxygen of 1.1, to obtain ceramic particles 6 having properties shown in Table 2.

Production Example 7

The ceramic particles produced in the same manner as in Production Example 1 were used except that the $MgO/Al_2O_3$ weight ratio of the raw material powder particles was set to 0.1. Using oxygen as a carrier gas, the powder particles were introduced into flame (2400° C.) generated by burning LPG (propane gas) and oxygen at a volume ratio of LPG to oxygen of 1.1, to obtain ceramic particles 7 having properties shown in Table 2.

Production Example 8

The ceramic particles produced in the same manner as in Production Example 1 were used except that the $MgO/Al_2O_3$ weight ratio of the raw material powder particles was set to 2. Using oxygen as a carrier gas, the powder particles were introduced into flame (2400° C.) generated by burning LPG (propane gas) and oxygen at a volume ratio of LPG to oxygen of 1.1, to obtain ceramic particles 8 having properties shown in Table 2.

Production Example 9

The ceramic particles produced in the same manner as in Production Example 1 were used except that the $MgO/Al_2O_3$ weight ratio of the raw material powder particles was set to 4. Using oxygen as a carrier gas, the powder particles were introduced into flame (2400° C.) generated by burning LPG (propane gas) and oxygen at a volume ratio of LPG to oxygen of 1.1, to obtain ceramic particles 9 having properties shown in Table 2.

Production Example 10

The ceramic particles produced in the same manner as in Production Example 1 were used except that alumina (purity: 99.99%) and magnesia (purity: 99.99%) were used as the raw material powder particles. Using oxygen as a carrier gas, the powder particles were introduced into flame (2400° C.) generated by burning LPG (propane gas) and oxygen at a volume ratio of LPG to oxygen of 1.1, to obtain ceramic particles 10 having properties shown in Table 2.

Example 1

To 100 parts by weight of polystyrene (GP-1B manufactured by Toyo Styrene Co., Ltd.), 1 part by weight of the ceramic particles 1 were mixed in a roll kneader (manufactured by Nishimura Machine Works Co., Ltd.) at 160° C. The obtained resin mixture was molded by a pressing machine (manufactured by Toyo Seiki, temperature: 185° C.) to produce a light diffusing member 1 having a thickness of 1 mm. Table 2 shows the results obtained by performing the above-mentioned evaluations using the light diffusing member 1.

Examples 2 to 6

Light diffusing members 2 to 6 were produced under the same conditions as those of Example 1 except that the ceramic particles 1 were substituted with ceramic particles 2 to 6 in Example 1. Table 2 shows the results obtained by performing the above-mentioned evaluations using the light diffusing members 2 to 6.

Example 7

A light diffusing member 7 was produced on the same conditions as those of Example 1 except that the ceramic particles 1 were substituted with the ceramic particles 7 in Example 1 and 0.1 parts by weight of the ceramic particles 7 were added into 100 parts by weight of polystyrene. Table 2 shows the results obtained by performing the above-mentioned evaluations using the light diffusing member 7.

Examples 8 to 10

Light diffusing members 8 to 10 were produced under the same conditions as those of Example 1 except that the ceramic particles 1 were substituted with ceramic particles 8 to 10 in Example 1. Table 2 shows the results obtained by performing the above-mentioned evaluations using the light diffusing members 8 to 10.

Example 11

A light diffusing member 11 was produced on the same conditions as those of Example 1 except that the ceramic particles 1 were substituted with the ceramic particles 2 in Example 1 and 0.1 parts by weight of the ceramic particles 2 were added into 100 parts by weight of polystyrene. Table 2 shows the results obtained by performing the above-mentioned evaluations using the light diffusing member 11.

Example 12

A light diffusing member 12 was produced on the same conditions as those of Example 1 except that the ceramic particles 1 were substituted with the ceramic particles 4 in Example 1 and 5 parts by weight of the ceramic particles 4 were added into 100 parts by weight of polystyrene. Table 2 shows the results obtained by performing the above-mentioned evaluations using the light diffusing member 12.

Comparative Example 1

A comparative member 1 was produced under the same conditions as those of Example 1 except that a commercially available spherical alumina powder having properties shown in Table 2 was used. Table 2 shows the results obtained by performing the above-mentioned evaluations using the comparative member 1.

Comparative Example 2

A comparative member 2 was produced under the same conditions as those of Example 1 except that a commercially available spherical alumina powder having properties shown in Table 2 was used and 3 parts by weight of the alumina powder were added into 100 parts by weight of polystyrene. Table 2 shows the results obtained by performing the above-mentioned evaluations using the comparative member 2.

Comparative Example 3

A comparative member 3 was produced under the same conditions as those of Example 1 except that a commercially available spherical polymethyl methacrylate (PMMA) bead powder having properties shown in Table 2 was used. Table 2 shows the results obtained by performing the above-mentioned evaluations using the comparative member 3.

Comparative Example 4

A comparative member 4 was produced under the same conditions as those of Example 1 except that a commercially available spherical alumina powder having properties shown in Table 2 was used and 5 parts by weight of the alumina powder were added into 100 parts by weight of polystyrene. Table 2 shows the results obtained by performing the above-mentioned evaluations using the comparative member 4.

TABLE 2

| | | Characteristics of ceramic particles | | | | |
|---|---|---|---|---|---|---|
| | | Main component | Spheroidizing method | Sphericity | Total amount of MgO and $Al_2O_3$ (% by weight) | $MgO/Al_2O_3$ |
| Example 1 | ceramic particles 1 | $Al_2O_3$ and MgO | none | 0.75 | 99 | 0.4 |
| Example 2 | ceramic particles 2 | $Al_2O_3$ and MgO | flame fusion method | 0.96 | 99 | 0.4 |
| Example 3 | ceramic particles 3 | $Al_2O_3$ and MgO | none | 0.80 | 99 | 0.4 |
| Example 4 | ceramic particles 4 | $Al_2O_3$ and MgO | flame fusion method | 0.97 | 99 | 0.4 |
| Example 5 | ceramic particles 5 | $M_2O_3$ and MgO | none | 0.85 | 98 | 0.4 |
| Example 6 | ceramic particles 6 | $Al_2O_3$ and MgO | flame fusion method | 0.98 | 99 | 0.4 |
| Example 7 | ceramic particles 7 | $Al_2O_3$ and MgO | flame fusion method | 0.98 | 99 | 0.1 |
| Example 8 | ceramic particles 8 | $Al_2O_3$ and MgO | flame fusion method | 0.99 | 99 | 2 |
| Example 9 | ceramic particles 9 | $Al_2O_3$ and MgO | flame fusion method | 0.97 | 99 | 4 |
| Example 10 | ceramic particles 10 | $Al_2O_3$ and MgO | flame fusion method | 0.99 | 99.9 | 0.4 |
| Example 11 | ceramic particles 2 | $Al_2O_3$ and MgO | flame fusion method | 0.96 | 99 | 0.4 |
| Example 12 | ceramic particles 4 | $Al_2O_3$ and MgO | flame fusion method | 0.97 | 99 | 0.4 |
| Comparative Example 1 | commercially available spherical alumina powders | $Al_2O_3$ | commercial item | 0.90 | | |
| Comparative Example 2 | commercially available spherical alumina powders | $Al_2O_3$ | commercial item | 0.90 | | |

TABLE 2-continued

| | | | | |
|---|---|---|---|---|
| Comparative Example 3 | commercially available spherical PMMA powders | polymethyl methacrylate | commercial item | 0.95 |
| Comparative Example 4 | commercially available spherical alumina powders | $Al_2O_3$ | commercial item | 0.90 |

| | Characteristics of ceramic particles | | Characteristics of light diffusing member | | |
|---|---|---|---|---|---|
| | Average particle diameter (μm) | Refraction factor | Blending amount of added particles (part by weight) | Total transmissivity (%) | Light scattering intensity (%) |
| Example 1 | 10 | 1.72 | 1 | 82.8 | 80.2 |
| Example 2 | 10 | 1.72 | 1 | 86 | 82.3 |
| Example 3 | 3 | 1.72 | 1 | 77.3 | 87.7 |
| Example 4 | 3 | 1.72 | 1 | 87 | 86.9 |
| Example 5 | 0.9 | 1.72 | 1 | 80.5 | 87 |
| Example 6 | 0.9 | 1.72 | 1 | 87.5 | 90.5 |
| Example 7 | 3 | 1.75 | 0.1 | 88 | 85 |
| Example 8 | 1 | 1.7 | 1 | 87 | 86 |
| Example 9 | 1 | 1.68 | 1 | 88 | 84 |
| Example 10 | 3 | 1.72 | 1 | 89 | 90 |
| Example 11 | 10 | 1.72 | 0.1 | 86 | 82.3 |
| Example 12 | 3 | 1.72 | 5 | 83 | 91 |
| Comparative Example 1 | 10 | 1.75 | 1 | 87.2 | 49.6 |
| Comparative Example 2 | 10 | 1.75 | 3 | 80.8 | 79.8 |
| Comparative Example 3 | 10 | 1.49 | 1 | 90.3 | 49.9 |
| Comparative Example 4 | 10 | 1.75 | 5 | 76 | 81 |

Table 2 clearly shows that the total transmissivity of the light diffusing member of the present invention exceeds 70%, and the light scattering intensity of the light diffusing member is higher than that of the light diffusing member into which a conventional product is added despite of the small amount of the filler to be added. Particularly, Table 2 shows that the total transmissivity of the light diffusing member into which the ceramic particles spheroidized by the flame fusion method are added is higher.

Example 13

To 100 parts by weight of acrylic pellets (acrylic pellet VH-001 manufactured by Mitsubishi Rayon Co., Ltd.), 2 parts by weight of the ceramic particles 4 of Production Example 4 were mixed. A light diffusing member 13 having a thickness of 1 mm was produced under the same conditions as those of Example 1. Table 3 shows the results obtained by performing the light resistance test using the light diffusing member 13.

Comparative Example 5

In Example 13, a comparative member 5 was produced under the same conditions as those of Example 13 except that 2 parts by weight of crosslinked polystyrene (average particle diameter: 6 μm, sphericity: 0.95, refraction factor: 1.59) was added in place of the ceramic particles 4 of Production Example 4. Table 3 shows the results obtained by performing the light resistance test using the comparative member 5.

TABLE 3

| | Δb* | |
|---|---|---|
| Light irradiation time (hour) | Light diffusing member 13 | Comparative member 5 |
| 120 | 0 | 0.23 |
| 180 | 0 | 0.46 |
| 240 | 0 | 0.64 |

Table 3 clearly shows that the light diffusing member 13 of the present invention showed no yellowing by the accelerated light resistance test. However, the comparative member 5 turned yellow with the light irradiation time.

The invention claimed is:
1. A light diffusing member comprising a base material and ceramic particles contained in the base material, wherein the ceramic particles comprise a composition in which the total amount of MgO and $Al_2O_3$ is 80% by weight or more and the weight ratio [$MgO/Al_2O_3$] of MgO and $Al_2O_3$ is 0.05 to 5;
   wherein the light diffusing member has a total transmissivity of 50% or more and a light scattering intensity of 70% or more.
2. The light diffusing member according to claim 1, wherein the ceramic particles are produced by a flame fusion method.
3. The light diffusing member according to claim 1, wherein the average particle diameter of the ceramic particles is 0.01 to 100 μm.
4. The light diffusing member according to claim 1, wherein the sphericity of the ceramic particles is 0.95 or more.

5. The light diffusing member according to claim 1, wherein the content of the ceramic particles is 0.1 to 6 parts by weight based on 100 parts by weight of the base material.

6. The light diffusing member according to claim 1, wherein the base material is a resin.

7. A light diffusing member comprising a base material and ceramic particles contained in the base material, the light diffusing member having a total transmissivity of 50% or more and a light scattering intensity of 70% or more, wherein the ceramic particles are obtained by fusing powder particles in flame, and the ceramic particles comprise a composition in which the total amount of MgO and $Al_2O_3$ is 80% by weight or more and the weight ratio [$MgO/Al_2O_3$] of MgO and $Al_2O_3$ is 0.05 to 5.

8. The light diffusing member according to claim 7, wherein the average particle diameter of the ceramic particles is 0.01 to 100 μm.

9. The light diffusing member according to claim 7, wherein the sphericity of the ceramic particles is 0.95 or more.

10. The light diffusing member according to claim 7, wherein the content of the ceramic particles is 0.1 to 6 parts by weight based on 100 parts by weight of the base material.

11. The light diffusing member according to claim 7, wherein the base material is a resin.

12. A method for producing a light diffusing member comprising a base material and ceramic particles contained in the base material, wherein the ceramic particles comprise a composition in which the total amount of MgO and $Al_2O_3$ is 80% by weight or more and the weight ratio [$MgO/Al_2O_3$] of MgO and $Al_2O_3$ is 0.05 to 5, wherein the light diffusing member has a total transmissivity of 50% or more and a light scattering intensity of 70% or more, the method comprising a step of dispersing the ceramic particles in the base material.

13. The method for producing the light diffusing member according to claim 12, wherein the step of dispersing the ceramic particles comprises a step of:
 (a) kneading the ceramic particles into the base material;
 (b) mixing the ceramic particles with a solution, emulsion, dispersion or suspension of the resin constituting the base material to mold the mixture into a sheet form;
 (c) forming a layer containing the ceramic particles and a binder on the surface of the sheet as the base material; or
 (d) adding the ceramic particles into monomers of the resin to polymerize the monomers when the resin constituting the base material is synthesized.

14. A method for producing a light diffusing member comprising a base material and ceramic particles contained in the base material, the light diffusing member having a total transmissivity of 50% or more and a light scattering intensity of 70% or more, wherein the ceramic particles are obtained by fusing powder particles in flame, and the ceramic particles comprise a composition in which the total amount of MgO and $Al_2O_3$ is 80% by weight or more and the weight ratio [$MgO/Al_2O_3$] of MgO and $Al_2O_3$ is 0.05 to 5, the method comprising a step of dispersing the ceramic particles in the base material.

15. The method for producing the light diffusing member according to claim 14, wherein the step of dispersing the ceramic particles comprises a step of:
 (a) kneading the ceramic particles into the base material;
 (b) mixing the ceramic particles with a solution, emulsion, dispersion or suspension of the resin constituting the base material to mold the mixture into a sheet form;
 (c) forming a layer containing the ceramic particles and a binder on the surface of the sheet as the base material; or
 (d) adding the ceramic particles into monomers of the resin to polymerize the monomers when the resin constituting the base material is synthesized.

* * * * *